United States Patent
Abraham et al.

(10) Patent No.: US 9,286,203 B2
(45) Date of Patent: Mar. 15, 2016

(54) CONTROL LOGIC DESIGN TO SUPPORT USB CACHE OFFLOAD

(71) Applicant: LSI CORPORATION, San Jose, CA (US)

(72) Inventors: Moby J. Abraham, Norcross, GA (US); Lakshmana M. Anupindi, Norcross, GA (US); R. Brian B. Skinner, Gainesville, GA (US); James A. Rizzo, Austin, TX (US); Mark J. Jander, Colorado Springs, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 254 days.

(21) Appl. No.: 13/735,720

(22) Filed: Jan. 7, 2013

(65) Prior Publication Data

US 2014/0195718 A1    Jul. 10, 2014

(51) Int. Cl.
| | | |
|---|---|---|
| G06F 12/00 | (2006.01) |
| G06F 12/02 | (2006.01) |
| G06F 9/00 | (2006.01) |
| G06F 11/00 | (2006.01) |
| G06F 12/08 | (2006.01) |
| G06F 11/14 | (2006.01) |
| G06F 11/20 | (2006.01) |
| G06F 1/30 | (2006.01) |

(52) U.S. Cl.
CPC .............. *G06F 12/0246* (2013.01); *G06F 9/00* (2013.01); *G06F 11/00* (2013.01); *G06F 11/1441* (2013.01); *G06F 12/0804* (2013.01); *G06F 1/30* (2013.01); *G06F 11/2015* (2013.01)

(58) Field of Classification Search
CPC .......................... G06F 3/0614; G06F 12/0246
USPC ......................................................... 711/114
See application file for complete search history.

(56) References Cited

U.S. PATENT DOCUMENTS

| | | | |
|---|---|---|---|
| 5,889,933 A | 3/1999 | Smith | |
| 7,536,506 B2 | 5/2009 | Ashmore et al. | |
| 7,809,886 B2 | 10/2010 | Ashmore et al. | |
| 7,818,500 B2 * | 10/2010 | Nagaram Chengal | 711/114 |
| 2008/0120463 A1 * | 5/2008 | Ashmore | 711/114 |
| 2008/0215808 A1 | 9/2008 | Ashmore et al. | |

OTHER PUBLICATIONS

U.S. Appl. No. 13/425,698, filed Mar. 21, 2012.

* cited by examiner

*Primary Examiner* — Matthew Bradley

(57) ABSTRACT

A redundant array of independent drives controller and board controlled cache off-loading during a power failure is described. Methods associated with the use of the redundant array of independent drives controller and board for controlled cache off-loading during a power failure are also described.

18 Claims, 6 Drawing Sheets

CONTROL LOGIC DESIGN TO SUPPORT USB CACHE OFFLOAD

FIELD

The present disclosure relates generally to computer systems and more particularly to storage systems.

BACKGROUND

In various computer storage systems, often one or more storage controllers, such as a Redundant Array of Independent Drives ("RAID"), are coupled to one or more storage devices to provide persistent storage and retrieval of user data. Host systems coupled to the storage controllers communicate input and output commands to store data on the storage devices and to retrieve previously stored data from the storage devices. High performance, high reliability storage controllers (such as in RAID storage systems) typically include cache memories used to enhance performance. Input and output commands received from the host systems may be quickly completed using the cache memory. Data previously read from the storage devices may be saved in the cache memory and used to quickly satisfy subsequent read request for the same data. However, during a power failure RAID storage systems are not able to save data in cache memory or may even lose cached memory, which can quickly deteriorate a computer's performance.

SUMMARY

An embodiment of the present invention may comprise a method for controlling cache offload during a power failure comprising: monitoring a power supply from a host peripheral component interconnect express connector unit to a redundant array of independent drives controller; identifying when a power failure from the power supply to the redundant array of independent drives controller has taken place; identifying whether a cache offload is required from the redundant array of independent drives controller cache to a non-volatile storage device at the time of power loss; preparing the redundant array of independent drives controller for a cache offload during the power failure; off-loading the cache from the redundant array of independent drives controller during the power failure; and proceeding to boot or power down the redundant array of independent drives controller after the cache offload from the redundant array of independent drives controller has been completed.

An embodiment of the present invention may further comprise a controller board device comprising a host peripheral component interconnect express connector unit; a redundant array of independent drives in communication with the host peripheral component interconnect express connector unit; a flash drive in communication with the redundant array of independent drives and an alternate power supply in communication with the redundant array of independent drives.

DETAILED DESCRIPTION OF THE EMBODIMENTS

Figure 1:
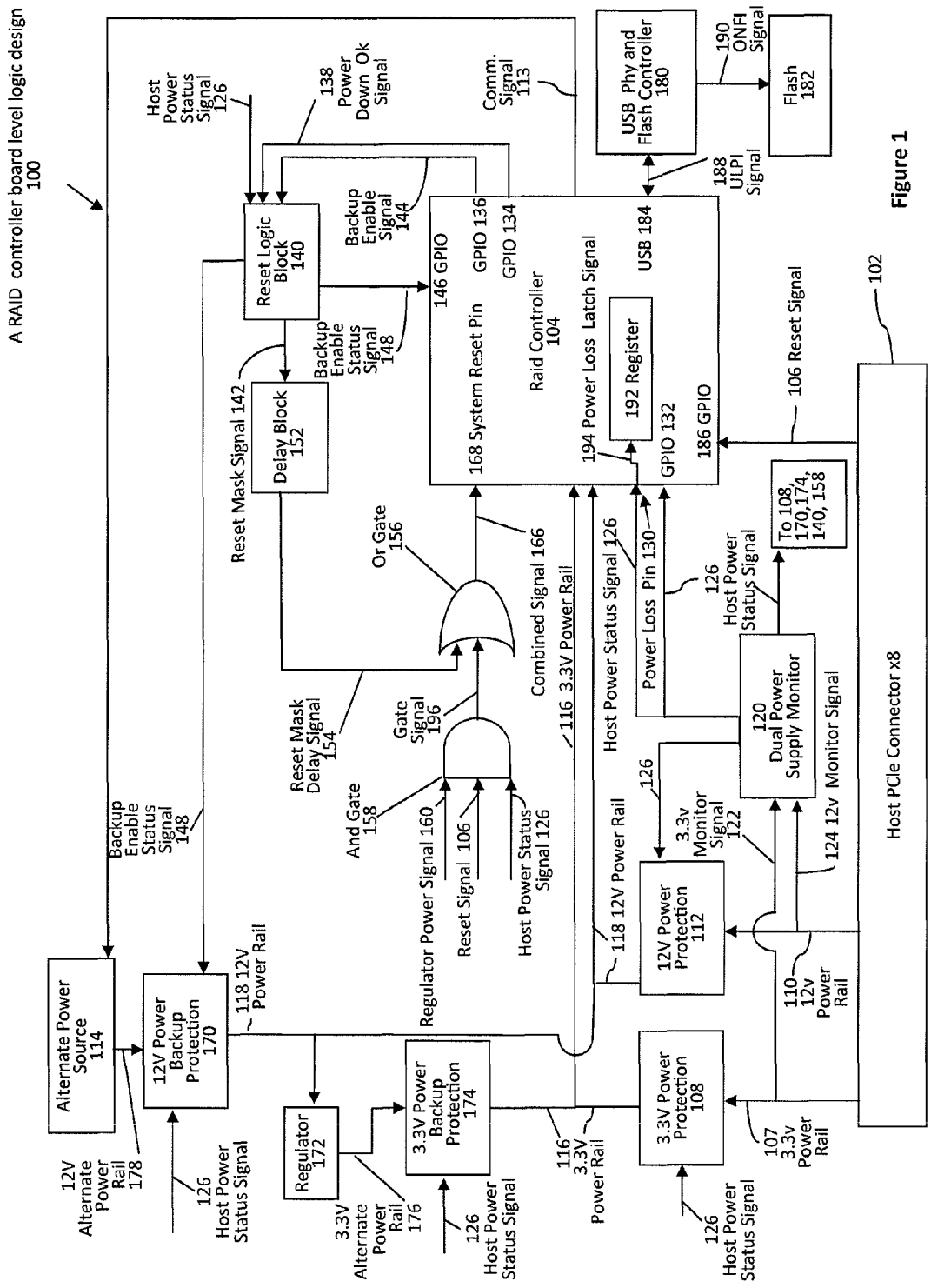
FIG. 1 is a block diagram of a board level logic design for controlling cache offload during a power failure.

As shown in FIG. 1, a redundant array of independent drives ("RAID"), controller board level logic design system 100 is provided that integrates a universal serial bus ("USB") cache offload feature into a RAID controller board. The integration allows data cache to be transferred to a non-volatile memory accessible through USB ports of a RAID control chip when a power failure happens and allows the data to be recovered from the non-volatile memory when power returns.

Referring to FIG. 1, a host peripheral component interconnect express unit, such as a peripheral component interconnect express (x8) Gold finger (PCIe), or other board to board connector 102, is provided on a RAID controller board 100 that allows the RAID controller chip 104 to be connected to a host system that supports the host peripheral component interconnect express connector unit 102. To supply power to the RAID controller 104, a 3.3V power rail 107 is transmitted from the host peripheral component interconnect express connector unit 102 to a 3.3V power protection unit 108. A 12V power rail 110 is transmitted from the host peripheral component interconnect express connector unit 102 to a 12V power protection unit 112. The 3.3V power protection unit 108 and the 12V power protection unit 112 comprise protection devices such a fuse to protect the RAID controller board 100 from a short circuit condition. The 3.3V power protection unit 108 and the 12V power protection unit 112 further comprise logic to limit the in rush of the 3.3V power rail 107 and the 12V power rail 110 current from the host peripheral component interconnect express connector unit 102 to the RAID controller 104 to prevent damage to devices, on the RAID controller 104 when the RAID controller 104 is turned on and connected to the host peripheral component interconnect express connector unit 102. In addition, the 3.3V power protection unit 108 and the 12V power protection unit 112 comprise power rail control logic which will turn on the 3.3V power rail 116 and the 12V power rail 118 when the host peripheral component interconnect express connector unit 102 power is good and turn OFF the 3.3V 116 and 12V 118 power rails when the host peripheral component interconnect express connector unit 102 power is lost to block the alternate power source 114 from feeding to the power rails 116 and 118 to the host peripheral component interconnect express connector unit 102. The 3.3V power rail 116 is transmitted from the 3.3V power protection unit 108 and the 12V power rail 118 is transmitted from the 12V power protection unit 112, where both the 3.3V power rail 116 and the 12V power rail 118 are transmitted to the RAID controller 104 to provide power to the RAID controller 104. The peripheral component interconnect express connector unit 102 also may transmit a reset signal 106 to the RAID controller 104 through a general purpose input/output port (GPIO) 186. The reset signal 106 allows the host peripheral component interconnect express connector unit 102 to reset the RAID control board 100 without disconnecting the power to the RAID control board 100. This is also referred to as soft reset or warm reset. As discussed later, this is where the RAID controller 104 simply resets without any cache offload. For a power failure event, where power from the host peripheral component interconnect express connector unit 102 to the RAID controller 104 is lost, the host peripheral component interconnect express connector unit 102 asserts a reset signal 106 and the power transmission from the host peripheral component interconnect express connector unit 102 to the RAID control board 100 is disconnected. Since power is lost, the RAID controller 104 reboots and cache offload is started.

As further shown in FIG. 1, the RAID controller 104 is in communication using a ULPI (UTMI+Low Pin Interface) signal 188 with a non-volatile memory or flash memory 182 through a USB phy and flash controller 180 by means of the USB port 184. The USB Phy converts parallel USB bus signals into serial bus signals. The flash controller converts serial USB data to parallel NAND flash interface. The USB phy and flash controller 180 is in communication with a non-volatile memory or flash 182 by means of an ONFI (open NAND flash interface) signal 190, which is a NAND flash.

A dual power supply monitor 120, monitors inputs of a 3.3V monitor signal 122 and 12V monitor signal 124 that monitor the power of the 12V power rail 110 and the 3.3V power rail 107 from the host peripheral component interconnect express connector unit 102 to the RAID controller 104. Based on the status of the 3.3V power rail 107 and 12V power rail 110, the dual power supply monitor 120 generates host power status signals 126 as output signals. The host power status signals 126 are transmitted by the dual power supply monitor 120 and provide the status of the 3.3V power rail 107 and the 12V power rail 110 to a power loss (POWER-LOSS_N) input pin 130 of the RAID controller 104 as well as a general purpose input/output pin 132 on the RAID controller, the 3.3V power protection block 108, the 12V power protection block 112, the 3.3V power backup protection block 174, the 12V power backup protection block 170, the reset logic block 140, and the AND gate 158. The host power status signal 126 from the dual power supply monitor 120 stays high when the 3.3V power rail 106 and the 12V power rail 110 from host peripheral component interconnect express connector unit 102 power are stable. The host power status signal 126 goes low when the host peripheral component interconnect express connector unit 102 power is out of specification limits. If the host power status signal 126 goes low, that is the indication to the firmware in the RAID controller 104 that the power is lost and a cache offload is needed. In the case of a power loss, the power loss pin 130 on the RAID controller 104 receives the host power status signal 126 and then transmits a power loss latch signal 194 to a power loss latch bit in a register 192 within the RAID controller 104, which asserts a power loss latch mode. Based on the assertion of the power loss latch mode, the RAID controller's 104 firmware identifies that power from the host peripheral component interconnect express connector unit 102 power is lost. The RAID control board 100 then switches to an alternate power supply 114 by means of the host power status signal 126 transmitted from the dual power supply monitor 120 to the 12V power backup protection block 170 and the backup enabled status signal 148 transmitted from the reset logic block 140 to the 12V power backup protection block 170, by turning on the power path control logics inside the 3.3V backup power protection 174 and the 12V backup power protection 170, in communication with a backup power regulator 172. If the host power status signal 126 goes low, the power status gets latched on the power loss input pin 130 of the RAID controller 104 is set or initiated to a power loss latch mode by means of a power loss latch mode signal 194 from the power loss pin 130 to a register 192 within the RAID controller 104 with a power loss latch bit in order to ensure proper chip functionality during the power loss. The firmware of the RAID controller 104, uses the power loss input pin (POWERLOSS_N) 130 as the decision point whether a cache offload is required or not. When the power loss input pin 130 is asserted, firmware of the RAID controller 104 bypasses the host peripheral component interconnect express core register access. The initiation of the power loss input pin 130 also provides the use of an alternate clock source, instead of the RAID controller 104 relying on the host peripheral component interconnect express connector unit 102 clock during the power loss.

In the present disclosure, the firmware of the RAID controller 104 is the same up to a certain point of a normal boot or a boot to do an offload. The RAID controller 104 firmware has three major components, common boot block, boot block and main firmware. As will be discussed later, common boot block is the start of execution of the system and is the initial check for power loss.

During the RAID controller's 104 firmware operation, if cache data becomes valid and dirty, a backup enable signal 144 is transmitted from the RAID controller 104 through a general purpose input/output port (GPIO) 136, from which point the backup enable signal 144 is transmitted to a reset logic block 140.

The reset logic block 140 generates a reset mask signal 142, which is used to block the reset signal 106 of the RAID controller 104 while a cache-offload is in progress. A backup enable status signal 148 is transmitted from the reset logic block 140 to the RAID controller 104 through a general purpose input/output port 146. The backup status enable signal 148 is used to enable the logic to connect the alternate power source 114 to the RAID controller 104 when host peripheral component interconnect express connector unit 102 power is lost and a cache offload is in progress. The backup enable status signal 148 serves as the confirmation to the RAID controller 104 that the backup is enabled. The reset logic block 140 uses the backup enable signal 144 as inputs from the RAID controller 104 firmware as well as a host power status signal 126 input from the dual power supply monitor 120 and a reset mask signal 142 is produced by the reset logic block 140. The reset mask signal 142 is driven high by the reset logic block 140 when the backup enable signal 144 is transmitted by the RAID controller's 104 firmware and the host power status signal 126 from the dual power supply monitor 120 is driven low due to a power loss event.

The reset mask signal 142 is transmitted from the reset logic block 140 and sent to a delay block 152 where the reset mask signal 142 is delayed and then transmitted as a reset mask delay signal 154 to an OR gate 156. At the OR gate 156 the reset mask delay signal 154 is combined with a signal from an AND gate 158. The gate signal 196 from the AND gate 158 is a combination of three signals, a regulator power good signal 160, which is a signal from the RAID control board regulators (not shown in FIG. 1) indicating that the output of all the voltage regulators on the RAID controller board 100 are good and stable, the reset signal 106 from the host peripheral component interconnect express connector unit 102 and the host power status signal 126 from the dual power supply monitor 120, which are combined and sent to the OR gate 156 where the combined signals 166 from the OR gate 156 are sent to system reset pin 168 in the RAID controller 104.

A backup enable status signal 148 is also transmitted to the 12V power backup protection unit 170. The 12V power backup protection unit 170 continuously receives a 12V alternate power rail 178 transmitted from an alternate power source 114. The 12V power backup protection unit 170 consists of power path control logic, which is turned ON when the backup enable status signal 148 is enabled by the reset logic block 140 when the RAID controller's 104 power loss latch bit 192 is ON. The RAID controller 104 monitors the health of the alternate power source 114 by means of a communication signal 113 using an I²C bus (not shown in FIG. 1). The 12V power backup protection unit 170 transmits a 12V power rail 118 (which is the same power rail as transmitted from the 12V power protection unit 112) to the RAID controller 104 and on to a backup power regulator 172. The backup power regulator 172 receives the 12V power rail 118 and then generates an alternate 3.3V power rail 176, which is transmitted to the 3.3V backup power protection unit 174. The 3.3V backup power protection unit 174 transmits a 3.3V power rail 116 to the RAID controller 104, which is the same as the 3.3V power rail 116 that is transmitted to the RAID controller 104 from the 3.3V power protection block 108. The 3.3V power backup protection unit 174 also consists of power path control110gic, which is turned ON when the backup enable status signal 148 is received from the reset logic block 140 when the RAID controller's 104 power loss latch bit 192 is ON.

Once cache offload is completed, a power down ok signal 138 is transmitted from the RAID controller 104 through a general purpose input/output port (GPIO) 134 to the reset logic block 140. The power down ok signal 138 is an output signal from the RAID controller 104 firmware to indicate to the reset logic block 140 that a cache offload is complete and the power to the RAID controller 104 can be turned off if the RAID controller 104 is still powered by the alternate power source 114 or release the reset signal 106 if the RAID controller 104 is powered by the host peripheral component interconnect express connector unit 102.

Figure 2:
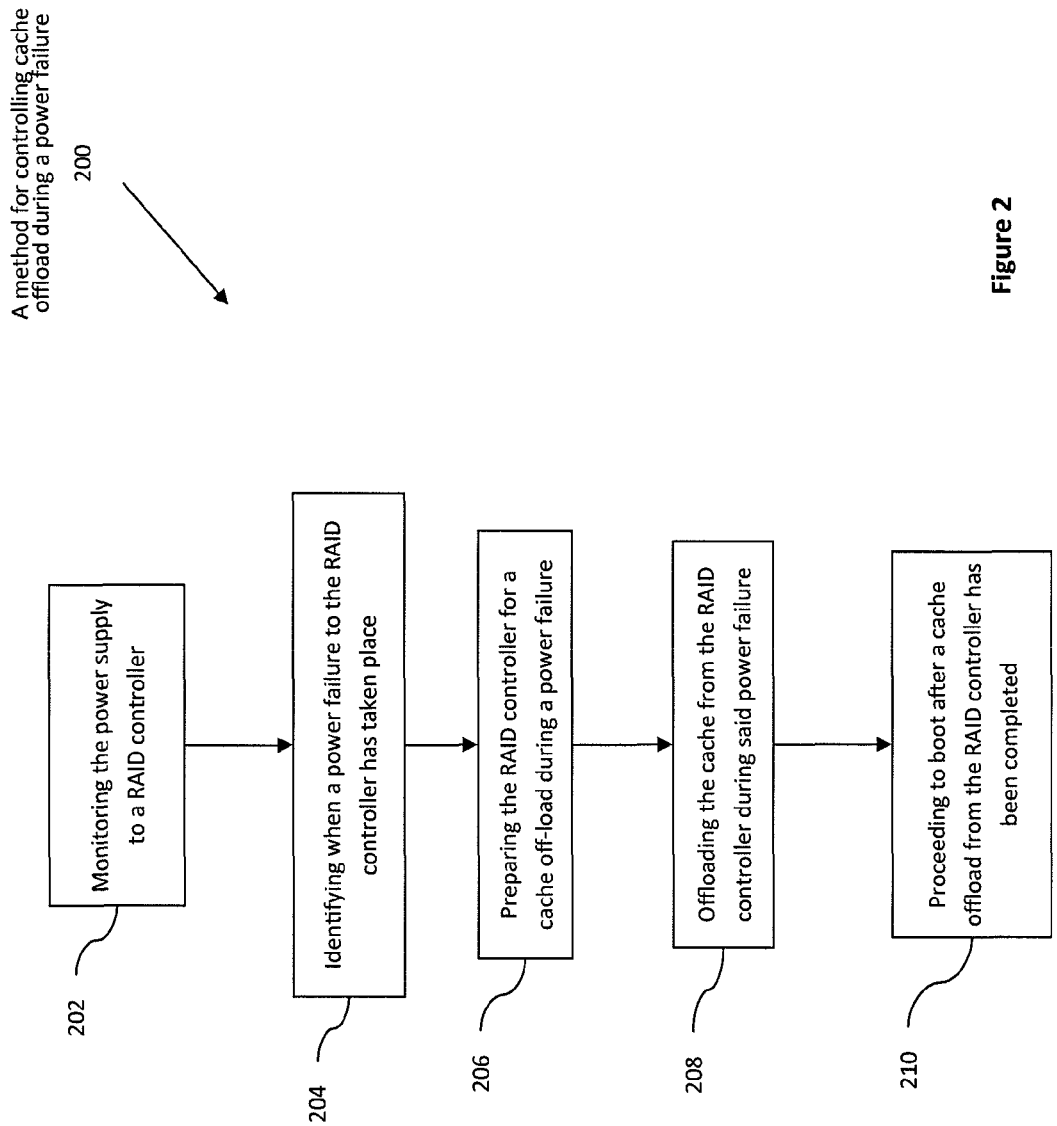
FIG. 2 is a flow diagram for a method for controlling cache offload during a power failure.

Referring to FIG. 2, a flow diagram is provided showing a method for controlling cache offload during a power failure 200. As shown in step 202, the control board housing the RAID controller monitors the power supply to the RAID controller from the host peripheral component interconnect express connector unit. In step 204, the control board will identify when a power failure or power is lost from the host peripheral component interconnect express connector unit to the RAID controller. In step 206, once a power loss has been identified, the firmware of the RAID controller will then begin preparing the RAID controller for a cache off-load during the power failure. The step 208, the firmware of the RAID controller will the begin offloading cache from the RAID controller to a non-volatile memory during the power failure until the cache is completely offloaded to the non-volatile memory. In step 210, once the cache offload is completely offloaded from the RAID controller to the non-volatile memory, the RAID controller's firmware will proceed to a boot, such as a normal boot, depending on the status of the power to the RAID controller.

Figure 3:
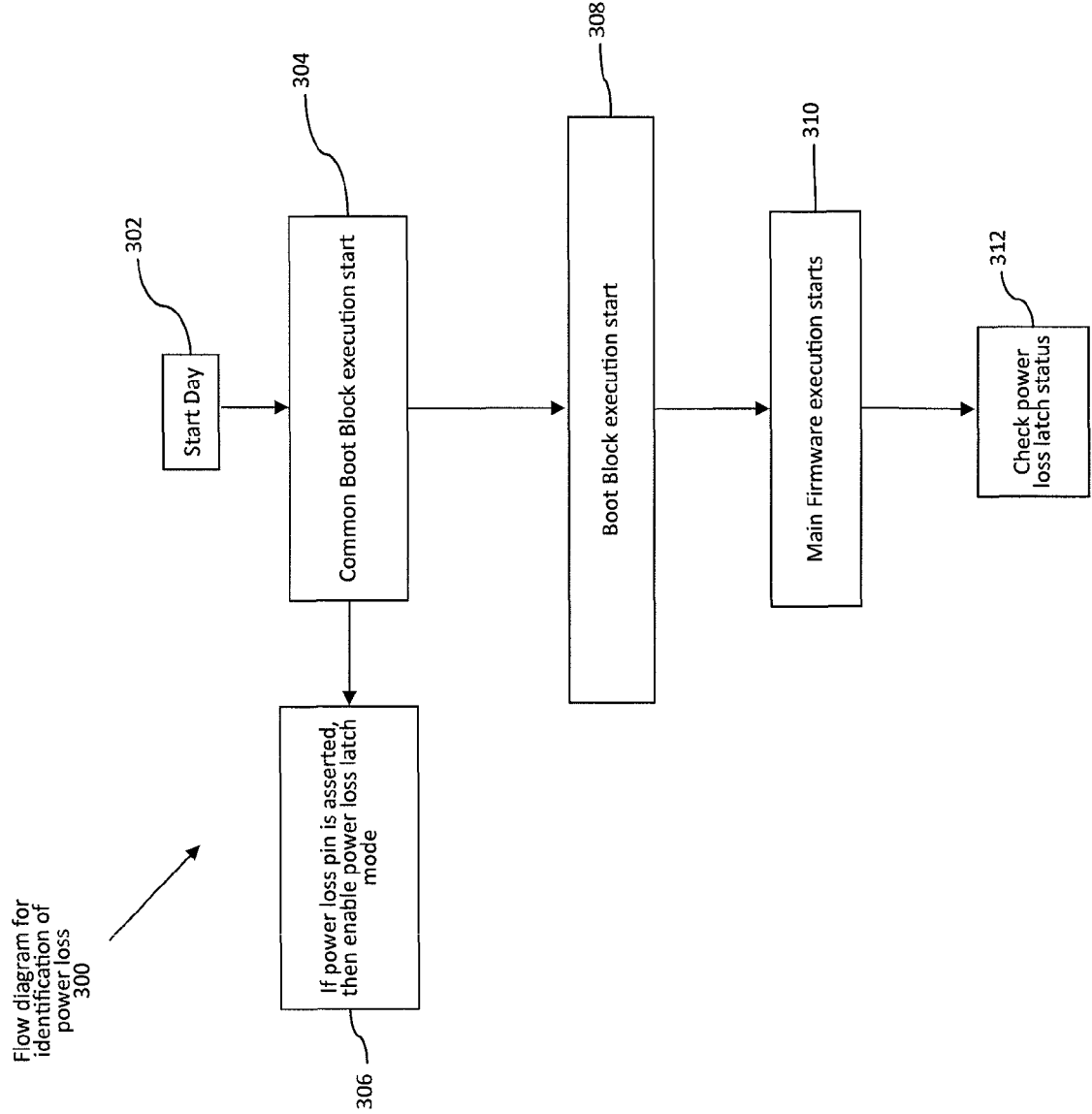
FIG. 3 is a flow diagram for identification of power loss to a redundant array of independent drives.

As shown in FIG. 3, a flow diagram is provided showing the initial steps for the identification of a power loss to the host peripheral component interconnect express connector unit 300. The flow chart in FIG. 3 has three major components, common boot block, boot block and main firmware execution. In step 302, the day begins for the RAID control board system of the present disclosure. In step 304, the common boot block begins execution and checks to see if a power loss signal has been asserted to indicate a power loss scenario. The power loss signal or the host power status signal 126 as shown in FIG. 1, which is a signal from the hardware logic, (Dual Power Supply Monitor 120 of FIG. 1) indicates that power from the host peripheral component interconnect express block is lost. In step 306, if the power loss signal is asserted, the power loss signal enables a clock switch bit in a chip register forcing the RAID control chip to use an alternate clock source instead of the peripheral component interconnect express unit clock if power is lost to the peripheral component interconnect express unit. If the power loss signal is asserted, then the common boot block also enables the power loss latch mode in a chip register bit or the power loss latch bit. This power loss latch mode allows the RAID controller's firmware to control when the switch back to the peripheral component interconnect express unit clock occurs if power returns to the peripheral component interconnect express unit and the peripheral component interconnect express unit clock. In addition, this power loss latch bit serves as the indicator for other modules that a power loss is detected on power up and an offload is needed to complete. If the power loss signal is not asserted, then the common boot block of step 304 and the boot block of step 308 will check the status of the peripheral component interconnect express unit link to the RAID controller before deciding that the host peripheral component interconnect express unit power is good and stable before continuing in normal mode. In step 308, the boot block begins execution and checks the peripheral component interconnect express unit clock or the power loss signal. If the power loss signal is asserted, the boot block will disable the link and the hot reset between the host peripheral component interconnect express connector unit and the RAID controller. The power loss signal will then reset all cores and modules that are not needed for a cache offload. If the power loss signal is asserted, that tells the RAID controller's firmware that host peripheral component interconnect express unit power is lost and the RAID controller is placed on an alternate power source and cycled through a reset by hardware logic. This is the decision point for RAID controller's firmware to do the cache offload. If the power loss signal is asserted the power loss latch mode bit in a RAID control chip register is set. This is needed for proper chip functionality during a power glitch. This power loss latch mode bit is also used to communicate the decision about cache offload to other firmware modules. In step 310, the main firmware checks to see if the main power loss latch mode in the RAID controller has been enabled. The power loss input pin in the RAID controller is enabled if common boot block/boot block have detected a power loss signal. The step 312, RAID controller's firmware will again check the status of the power loss latch mode.

Figure 4:
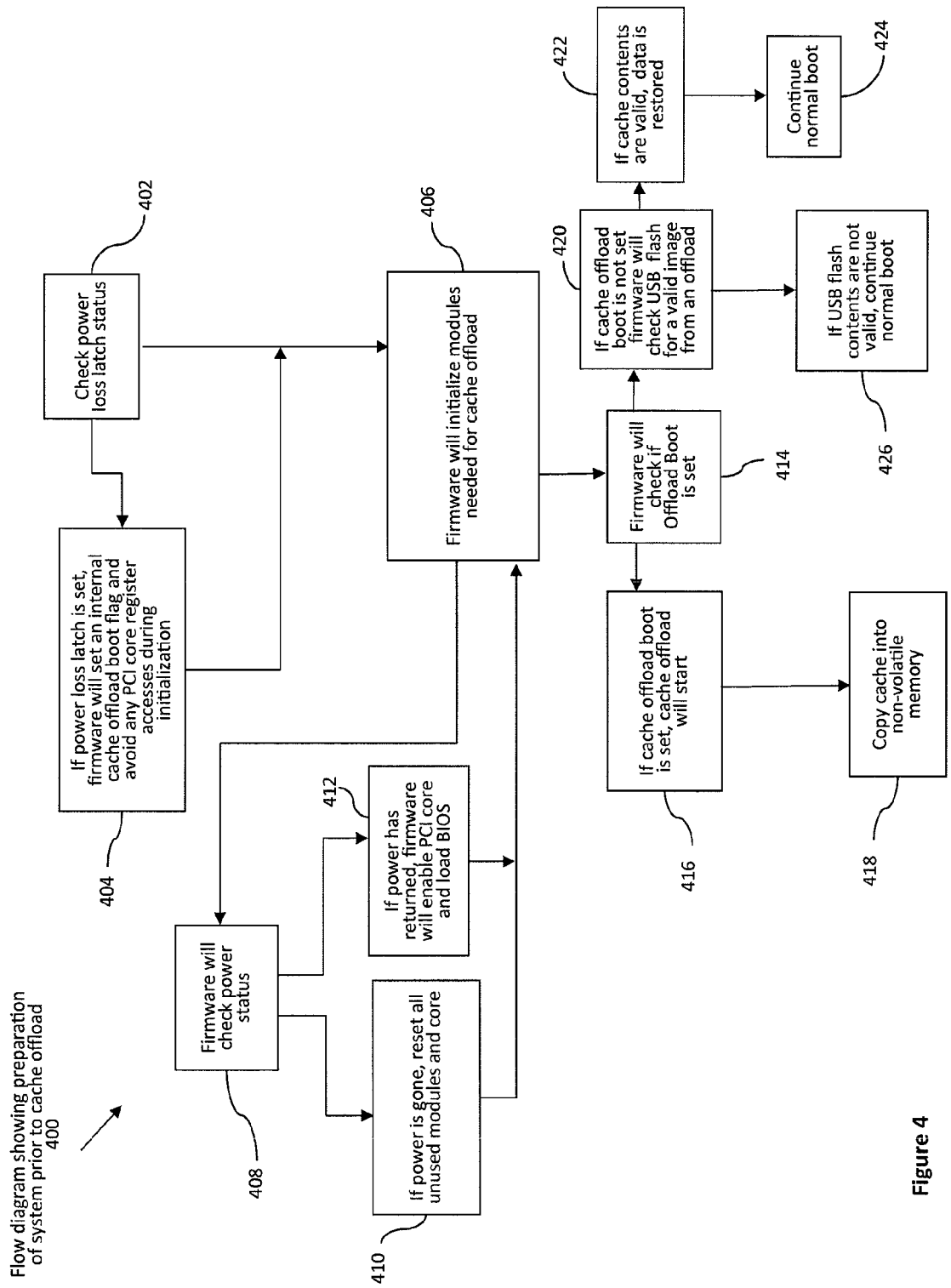
FIG. 4 is a flow diagram showing preparation of the system prior to cache offload.

As shown in FIG. 4, a flow diagram showing preparation of the system prior to cache offload is provided 400. In step 402, which is the same step as step 312 of FIG. 3, the main firmware of the RAID controller checks to see if the power loss latch mode in the RAID controller has been enabled. The power loss latch mode in the RAID controller is enabled if common boot block/boot block have detected a power loss signal. In step 404, if the power loss latch mode is enabled, the RAID controller's firmware will set an internal offload boot flag and avoid any of the host peripheral component interconnect express connector unit core register accesses during initialization. In step 406, the firmware of the RAID controller will initialize modules needed for cache offload. In step 408, the RAID controller's firmware will continue to periodically check the power status of the host peripheral component interconnect express unit. In step 410, if the RAID controller's firmware identifies that the power to the system remains down or has been lost again, the system will reset all unused modules and cores that are not needed for cache offload and then the system will return to step 406 where the RAID controller's firmware will continue to initialize the modules needed for cache offload. In step 412, if power to the host peripheral component interconnect express unit has returned, the system will de-assert all module resets of the RAID controller chip, de-assert peripheral component interconnect express unit cores and will initialize peripheral component interconnect express unit core and load BIOS as well as enable the peripheral component interconnect express unit configuration access. In step 414, the RAID controller's firmware will check to see if offload boot flag, based on the cache offload identified by the RAID controller's firmware, has been set. In step 416, if the offload boot flag as identified by the RAID controller's firmware has been set and all of the modules needed for USB offload are initialized, the RAID controller's firmware will start the cache offload. In step 418, once the cache offload starts, RAID controller's firmware will continue the cache offload even if a power glitch scenario occurs, and with the use of the alternate power source as a backup power source, the cache offload will continue to completion. In step 420, if the system is in normal boot, the RAID controller's firmware will check whether the non-volatile memory has a valid image stored in the non-volatile memory since the last power failure. In step 422, if the non-volatile memory contents are shown to be valid, then the data is restored to the cache memory (DDR) and in step 494, the system will continue with a normal boot. In step 426, if the data in the non-volatile memory is not valid, the RAID controller's firmware will continue normal boot.

Figure 5:
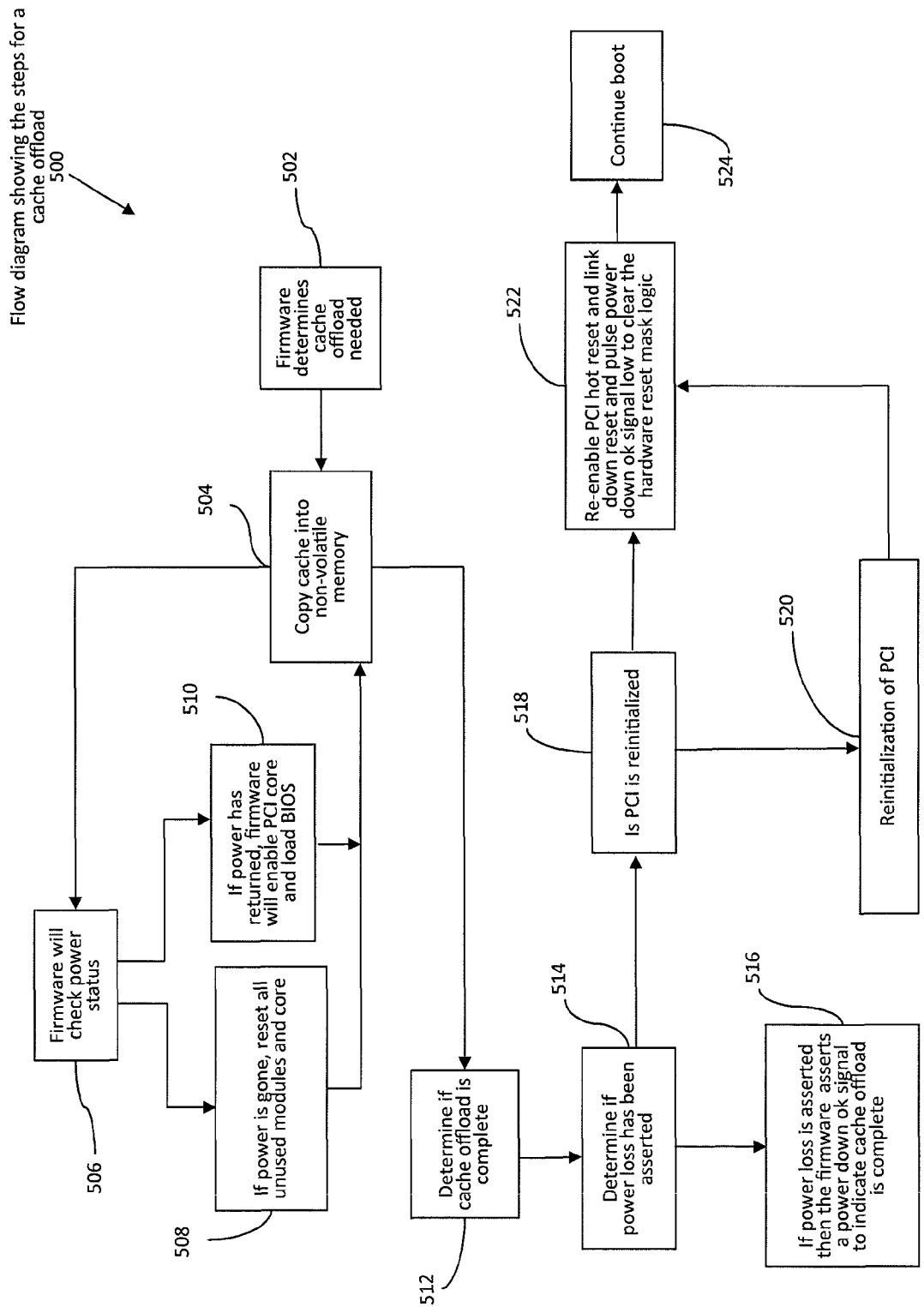
FIG. 5 is a now diagram showing the steps for a cache offload.

As shown in FIG. 5, a flow diagram is provided showing the steps for a cache offload of the present disclosure 500. In step 502, when the RAID controller's firmware identifies that a cache offload is needed and an offload boot is set, the RAID controller's firmware initiates the system to copy the contents of the cache into non-volatile memory. In step 504, the contents of the cache are copied into non-volatile memory. In step 506, the RAID controller's firmware will continue to periodically check the power status of the peripheral component interconnect express unit. In step 508, if the RAID controller's firmware identifies that the power to the system remains lost or has been lost again, the system will reset all unused modules and cores that are not needed for cache offload and then the system will return to step 504 where firmware will continue to copy cache into non-volatile memory. In step 510, if power to the peripheral component interconnect express unit has returned, the system will de-assert all module resets in the RAID controller, de-assert peripheral component interconnect express unit cores and will initialize peripheral component interconnect express unit core and load BIOS as well enable the peripheral component interconnect express unit configuration access. The RAID controller's firmware also enables a reset detection interrupt logic to reset the peripheral component interconnect express unit (PCI) core if peripheral component interconnect express unit issues a reset. This allows the peripheral component interconnect express unit link between the host peripheral component interconnect express unit and RAID controller to be in sync through multiple resets on power up, which some systems employ. In step 512, the RAID controller firmware will determine if the cache offload has been completed. Once the offload starts, the RAID controller's firmware will continue cache offload, even if a power glitch scenario occurs, offload will continue to the completion. In step 514, after of the cache is transferred to the non-volatile memory, the RAID controller firmware will conduct a final power status check. In step 516, if the host peripheral component interconnect express unit power still is not present when the cache offload completes, the RAID controller's firmware will assert a power down ok signal to indicate that the cache offload is complete to the hardware and the RAID controller can power down. In step 518, if power loss has not been asserted, the RAID controller's firmware will check to see if the peripheral component interconnect express unit has reinitialized. In step 520, if the peripheral component interconnect express unit has not reinitialized, the RAID controller's firmware will de-assert module resets and power core and wait for peripheral component interconnect express unit to be stable. The RAID controller's firmware will switch the clock source for the system to the peripheral component interconnect express unit clock by disabling the power loss latch mode bit and will wait for the peripheral component interconnect express unit link to be up. RAID controller firmware will then load the peripheral component interconnect express unit BIOS, set peripheral component interconnect express unit configuration values. In step 522, once power return is detected, the RAID controller's firmware will re-enable the peripheral component interconnect express unit link down reset and hot reset which was disabled at the start of an offload boot. The RAID controller's firmware will also release the reset masking signal by pulsing the power down ok signal. In this case a restore from non-volatile memory is not required since the contents of the cache are still valid. In step 524 in the case where the host peripheral component interconnect express unit power is back, the system will continue a normal boot.

Figure 6:
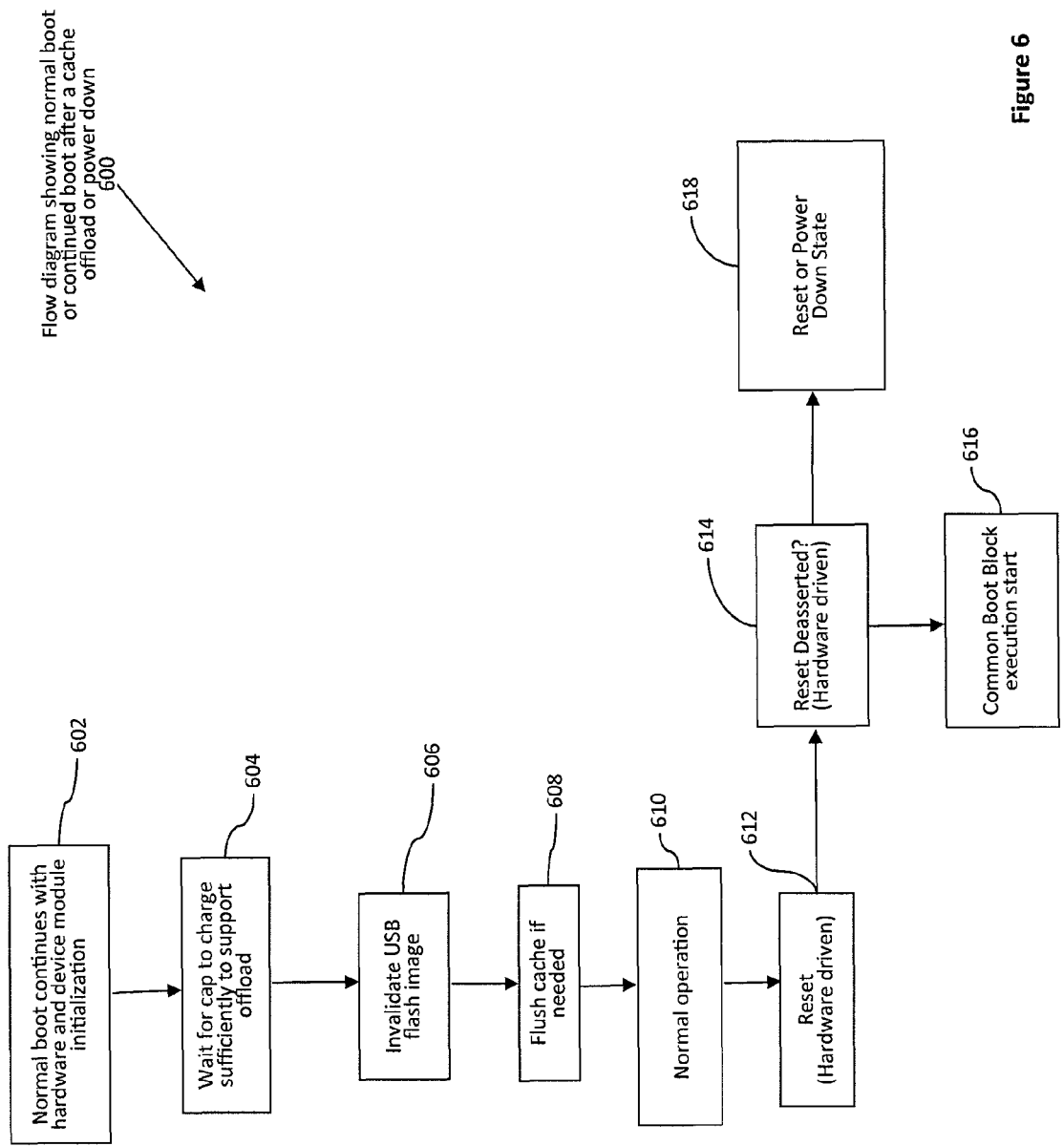
FIG. 6 is a flow diagram showing a normal boot or continued boot after a cache offload or power down.

As shown in FIG. 6, a flow diagram showing normal boot or continued boot after an offload is provided 600. In step 602, if the system is in normal boot, the RAID controller's firmware will continue with the rest of the hardware initialization and device module initialization, including board and device initializations. In step 604, the RAID controller's firmware will make sure that the alternate power source or cap has enough charge to support one offload before the RAID controller's firmware invalidates the current image in the non-volatile memory. This is needed to ensure that a cache offload can be completed if a power loss occurs again. In step 606, the USB flash image is invalidated so that a new offload can take place. In step 608, the data from cache is flushed to hard drive disk if needed. In step 610, the RAID controller's firmware then continues its normal operation. During normal operation, the RAID controller's firmware enables or disables cache offload using the backup enable signal based on whether the RAID controller's firmware has cache with valid data. In step 612, if a power loss occurs, the hardware logic will assert power loss input pin. In step 614, if power loss input pin is asserted because of a power loss, then the controllers hardware logic will switch the RAID controller to the alternate power source and the power reset is released if the RAID controller's firmware has enabled the cache offload. In step 616, the RAID controller's firmware will then start the day again and go through an offload path in with a common boot block execution start. In step 618, if the RAID controller's firmware has not requested an offload, hardware will not de-assert the power loss input pin reset and the hardware will go into a powered down state.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:
1. A method operable on a Redundant Array of Independent Drives (RAID) controller that is operable to communi- catively couple to a host system through a Peripheral Component Interconnect Express (PCIe) connector, the method comprising:

monitoring a power supply from the PCIe connector to the RAID controller;

identifying when a power failure from the power supply to the RAID controller has taken place;

enabling an alternate power source for the RAID controller once the power failure is identified;

identifying whether a cache offload is required from cache on the RAID controller to a non-volatile storage device at a time of the power failure;

preparing the RAID controller for the cache offload during the power failure;

off-loading the cache from the RAID controller during the power failure;

determining whether the power supply from the PCIe connector to the RAID controller has been restored in response to completing the cache offload from the RAID controller;

booting the RAID controller if the power supply has been restored; and disabling the alternate power source to power down the RAID controller if the power supply has not been restored.

2. The method of claim 1, further comprising:
initiating a power loss latch mode once the power failure has been identified.

3. The method of claim 2, further comprising:
monitoring if the power loss latch mode has been asserted and enabling an alternate clock source for the RAID controller.

4. A Redundant Array of Independent Drives (RAID) storage controller operable to communicatively couple to a host system through a Peripheral Component Interconnect Express (PCIe) connector to control Input/Output (I/O) operations to a plurality of storage devices, the RAID controller comprising:

a cache operable to cache data of write I/O requests to the storage devices;

power control logic;

an alternate power supply communicatively coupled to the power control logic that is operable to supply power to the RAID storage controller; and a Universal Serial Bus (USB) interface operable to communicatively couple to a nonvolatile storage device, wherein the power control logic is further operable to detect a loss of power from the PCIe connector for the RAID storage controller, and responsive to the loss of power, is further operable to:

to activate the alternate power supply;

to initialize the USB interface using power from the alternate power supply;

to perform a cache offload to transfer the cached data to the nonvolatile storage device through the USB interface;

determine whether power has returned to the PCIe connector;

boot the RAID controller if the power has returned; and disable the alternate power supply to power down the RAID controller if the power has not returned.

5. The RAID storage controller of claim 4, further comprising:

boot control logic communicatively coupled to the power control logic and operable to detect a reset signal from the PCIe connector for the RAID storage controller, to determine whether the cache offload is in progress, and to delay an application of the reset signal to the RAID storage controller until the cache offload is complete.

6. The RAID storage controller of claim 4, wherein:
the power control logic is further operable to power down modules of the RAID storage controller that are unnecessary for the cache offload in response to the loss of power.

7. The RAID storage controller of claim 4, further comprising:

boot control logic communicatively coupled to the power control logic, wherein the power control logic is further operable to direct the boot control logic to reinitialize the RAID storage controller after the power has returned to the PCIe connector, wherein the boot control logic is operable to restore the data to the cache memory from the nonvolatile storage device through the USB interface when the RAID storage controller reinitializes.

8. A method operable in a Redundant Array of Independent Drives (RAID) storage controller, the RAID storage controller being communicatively coupled to a host system through a Peripheral Component Interconnect Express (PCIe) connector to control Input/Output (I/O) operations of the host system to a plurality of storage devices, the method comprising:

caching, in a cache memory of the RAID storage controller, data of write I/O requests directed to the plurality of storage devices;

detecting a loss of power from the PCIe connector; and in response to detecting the loss of power:
activating an alternate power supply;
initializing a Universal Serial Bus (USB) interface using power from the alternate power supply;
performing a cache offload by transferring data from the cache memory to a nonvolatile storage device through the USB interface;
determining whether power has returned to the PCIe connector;
booting the RAID controller if the power has returned; and
disabling the alternate power supply to power down the RAID controller if the power has not returned.

9. The method of claim 8, further comprising:
detecting a reset signal from the PCIe connector for the RAID storage controller;
determining whether the cache offload is in progress; and
delaying an application of the reset signal to the RAID storage controller until the cache offload is complete.

10. The method of claim 8, further comprising:
powering down modules of the RAID storage controller that are unnecessary for the cache offload in response to detecting the loss of power.

11. The method of claim 8, further comprising:
reinitializing the RAID storage controller after the power has returned to the PCIe connector; and
restoring the data to the cache memory from the nonvolatile storage device through the USB interface when the RAID storage controller reinitializes.

12. A non-transitory computer readable medium for a Redundant Array of Independent Drives (RAID) storage controller, the RAID storage controller being communicatively coupled to a host system through a Peripheral Component Interconnect Express (PCIe) connector to control Input/Output (I/O) operations of the host system to a plurality of storage devices, the computer readable medium comprising instructions that, when directed by processor of the RAID storage controller, direct the RAID storage controller to:
 cache data of write I/O requests directed to the plurality of storage devices;
 detect a loss of power from the PCIe connector; and
 in response to the loss of power:
  activate an alternate power supply;
  initialize a Universal Serial Bus (USB) interface using power from the alternate power supply;
  perform a cache offload to transfer data from the cache memory to a nonvolatile storage device through the USB interface;
  determine whether power has returned to the PCIe connector;
  boot the RAID controller if the power has returned; and
  disable the alternate power supply to power down the RAID controller if the power has not returned.

13. The computer readable medium of claim 12, further comprising instructions that direct the RAID storage controller to:
 detect a reset signal from the PCIe connector for the RAID storage controller;
 determine whether the cache offload is in progress; and
 delay an application of the reset signal to the RAID storage controller until the cache offload is complete.

14. The computer readable medium of claim 12, further comprising instructions that direct the RAID storage controller to:
 power down modules of the RAID storage controller that are unnecessary for the cache offload in response to the loss of power.

15. The computer readable medium of claim 12, further comprising instructions that direct the RAID storage controller to:
 reinitialize the RAID storage controller after the power has returned to the PCIe connector; and
 restore the data to the cache memory from the nonvolatile storage device through the USB interface when the RAID storage controller reinitializes.

16. The method of claim 1 further comprising:
 blocking a reset signal from the PCIe connector to the RAID controller while the cache offload is in progress.

17. A method operable on a Redundant Array of Independent Drives (RAID) controller that is operable to communicatively couple to a host system through a Peripheral Component Interconnect Express (PCIe) connector, the method comprising:
 monitoring power supplied from the PCIe connector to the RAID controller;
 determining that a power failure from the PCIe connector to the RAID controller has occurred;
 determining whether an I/O data cache on the RAID controller is dirty responsive to the power failure; and
 responsive to determining that the I/O data cache is dirty:
  activating a backup power supply to power the RAID controller;
  performing a cache offload from the RAID controller to non-volatile memory;
  determine whether power has returned to the PCIe connector;
  boot the RAID controller if the power has returned; and
  disable the alternate power supply to power down the RAID controller if the power has not returned.

18. The method of claim 17 further comprising:
 masking a reset signal from the PCIe connector to the RAID controller while the cache offload is in progress.

* * * * *